(12) United States Patent
Convery et al.

(10) Patent No.: US 7,814,311 B2
(45) Date of Patent: Oct. 12, 2010

(54) ROLE AWARE NETWORK SECURITY ENFORCEMENT

(75) Inventors: Sean Convery, Mountain View, CA (US); David R. Oran, Acton, MA (US); James Rivers, Saratoga, CA (US); John Schnizlein, Fort Washington, MD (US); Ralph Droms, Westford, MA (US); Mark Stapp, Belmont, MA (US)

(73) Assignee: Cisco Technology, Inc., San Jose, CA (US)

( * ) Notice: Subject to any disclaimer, the term of this patent is extended or adjusted under 35 U.S.C. 154(b) by 321 days.

(21) Appl. No.: 11/373,727

(22) Filed: Mar. 10, 2006

(65) Prior Publication Data

US 2007/0214352 A1    Sep. 13, 2007

(51) Int. Cl.
*H04L 29/06* (2006.01)
(52) U.S. Cl. .................. 713/153; 713/152; 726/12; 726/13
(58) Field of Classification Search ............... 726/12–13
See application file for complete search history.

(56) References Cited

U.S. PATENT DOCUMENTS

| | | | | |
|---|---|---|---|---|
| 6,073,242 | A * | 6/2000 | Hardy et al. ................. | 726/1 |
| 7,293,098 | B2 * | 11/2007 | Sandhu et al. .............. | 709/229 |
| 7,555,527 | B1 * | 6/2009 | Slaughter et al. ............ | 709/213 |
| 2002/0026592 | A1 * | 2/2002 | Gavrila et al. ............... | 713/201 |
| 2003/0084293 | A1 * | 5/2003 | Arkko et al. ................ | 713/168 |
| 2003/0105742 | A1 * | 6/2003 | Boreham et al. ............. | 707/2 |
| 2003/0126468 | A1 | 7/2003 | Markham | |
| 2003/0152067 | A1 * | 8/2003 | Richmond et al. .......... | 370/352 |
| 2003/0225892 | A1 * | 12/2003 | Takusagawa et al. ........ | 709/227 |
| 2004/0083382 | A1 * | 4/2004 | Markham et al. ........... | 713/200 |
| 2004/0199792 | A1 * | 10/2004 | Tan et al. .................... | 713/201 |
| 2004/0215975 | A1 * | 10/2004 | Dudfield et al. ............. | 713/201 |
| 2004/0221190 | A1 * | 11/2004 | Roletto et al. ............... | 714/4 |
| 2004/0250134 | A1 * | 12/2004 | Kohler et al. ............... | 713/201 |
| 2005/0055573 | A1 * | 3/2005 | Smith ......................... | 713/201 |

(Continued)

OTHER PUBLICATIONS

David Ferraiolo and Richard Kuhn, "Role-Based Access Control", Proceedings of 15th National Computer Society, 1992, pp. 1-11.

(Continued)

*Primary Examiner*—Emmanuel L Moise
*Assistant Examiner*—Luu Pham
(74) *Attorney, Agent, or Firm*—Hickman Palermo Truong & Becker LLP

(57) ABSTRACT

Generating a binding between a source address and one or more roles of a user accessing the network and distributing the binding to a filter node. The source address is currently assigned to the device. The binding may be generated by one or more nodes on an ingress path used during authentication of the user. The binding may be distributed to the filter node on demand or without any request from the filter node. Responsive to a determination that the user is associated with a new source address, a new binding is generated to associate a new source address with the one or more roles for the user. The new binding is distributed to the filter node. Another aspect is a method of enforcing a role based security policy at a filter node, using bindings of source addresses to roles.

27 Claims, 5 Drawing Sheets

U.S. PATENT DOCUMENTS

| | | | |
|---|---|---|---|
| 2005/0129019 A1* | 6/2005 | Cheriton | 370/392 |
| 2005/0190758 A1* | 9/2005 | Gai et al. | 370/389 |
| 2005/0283608 A1* | 12/2005 | Halcrow et al. | 713/175 |
| 2005/2083608 | 12/2005 | Kalcrow et al. | |
| 2006/0059253 A1* | 3/2006 | Goodman et al. | 709/223 |
| 2006/0090208 A1* | 4/2006 | Smith | 726/26 |
| 2007/0005971 A1* | 1/2007 | Leung et al. | 713/171 |

OTHER PUBLICATIONS

R. Yavatkar, D. Pendarakis, R. Guerin, "A Framework for Policy-based Admission Control", Network Working Group Request for Comments: 2753, Universtiy of Pennsylvania, Jan. 2000, pp. 1-20.

Cisco—Understanding and Configuring VLAN Trunk Protocol (VTP), Document ID: 10558, 33 pgs.

"Overview of Routing Between Virtual LANs", Cisco—IOS Switching Services Configuration Guide, pp. XC-31-XC36.

S. Kent and R. Atkinson, "Security Architecture for the Internet Protocol", Network Working Group Request for Comments: 2401, @Home Network, Nov. 1998, pp. 1-66.

David Greene, "802.1Q VLANs for better bandwith", Network World, Mar. 5, 2001, http://www.networkworld.com/news/tech/2001/0305tech.html, pp. 1-2.

International Searching Authority, "International Search Report", PCT/US07/63458, dated Jul. 15, 2008, 12 pages.

Claims, PCT/US07/63458, 3 pages.

* cited by examiner

ROLE AWARE NETWORK SECURITY ENFORCEMENT

FIELD OF THE INVENTION

The present invention generally relates to network security. The invention relates more specifically to a method and apparatus for role based security using source addresses.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

It is often desirable to differentiate access to a network or resource in a network based on attributes of the user or device seeking access. For example, an engineering manager may be allowed access to a server having information related to engineering, as well as a server having personnel information. However, an engineer may not be allowed access to the personnel information. Similarly, a piece of laboratory equipment may be permitted access to other laboratory equipment, but not to servers performing business functions. Thus, it is desirable to control network traffic in order to control access to a resource, device, or network, based on one or more characteristics of a user or device. One technique for role-based access control is described by Ferraiolo and Kuhn in, "Role-Based Access Control" (Proceedings of the 15$^{th}$ National Security Computer Conference, 1992).

Access control lists are one way to control network traffic. Access control lists filter network traffic by controlling whether routed packets are forwarded or blocked, typically at a router interface, although other devices can filter packets. The router examines each packet to determine whether to forward or drop the packet, on the basis of the criteria specified within the access lists. An access control list criterion could be the source address of the traffic or the destination address of the traffic.

Internet Protocol (IP) addresses once served as invariable identifiers of the source device on an IP-based network. Access control lists were developed to allow differentiated access based on this IP identifier within the network. However, IP addresses are no longer tightly bound to either a device or a user. For example, at one point in time, entities were statically addressed. Moreover, laptops, PDAs, and other mobile devices did not exist. Today, with dynamic DHCP addressing and mobile devices seeking network access, the significance that can be placed on a given IP address over another for the purpose of identifying a user of device has declined significantly. As a result, ACLs in all but the broadest implementations have been far less useful.

There have been several attempts to address this problem. One technique inserts, into every frame sent on a network, a 16-bit tag defining the role associated with the traffic. However, this technique places a burden on the hardware to insert and interpret the tags. Other techniques use "tunneling," e.g. IPSEC VPN tunneling, to identify the source of traffic as being associated with a given tunnel.

Other techniques constrain the assignment of IP addresses to follow the roles rather than the network topology. For example, one technique defines a subnet per-role and associates a VLAN per role on the access switch. When the user authenticates, the user's or device's role is determined, which results in a specific VLAN (and subsequent subnet) assignment.

Based on the foregoing, there is a clear need for an improved method for differentiating access to a resource or network, based on user or device identity.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
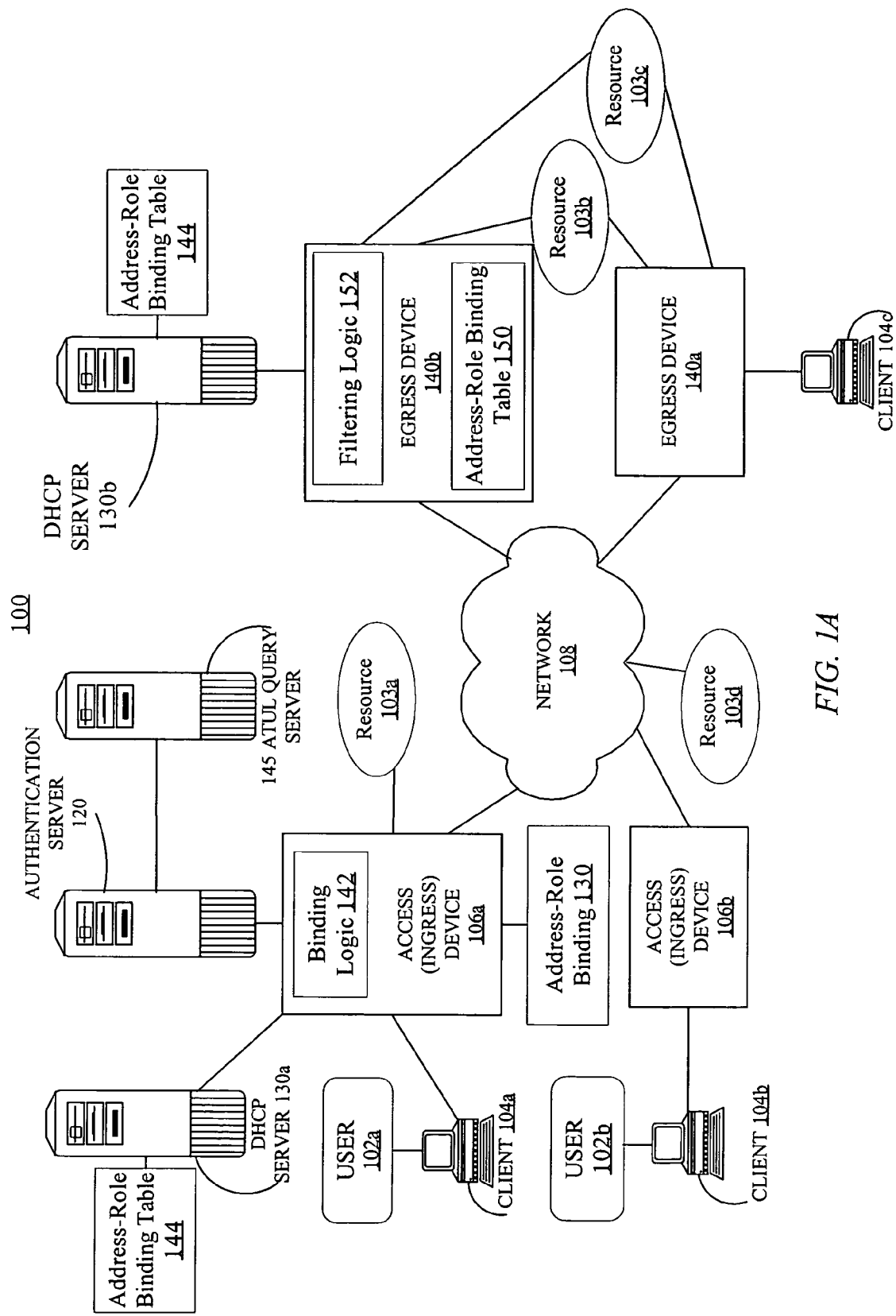
FIG. 1A is a block diagram that illustrates an overview of a network in accordance with an embodiment.

A method and apparatus for role-based security based on source address is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Role Based Security Based on Source Addresses
    2.1 Structural Overview
    2.2 Functional Overview
    3.0 Distribution Mechanisms
    3.1 Pre-Population of Bindings
    3.2 On Demand Distribution of Bindings
    3.3 Combination Approaches
    4.0 Other Considerations
    4.1 DHCP Releases
    4.2 Multi-User Devices
    4.3 Role Changes While Binding Still Valid
    4.4 IP Spoofing
    4.5 Denial of Service Attacks
    5.0 Implementation Mechanisms: Hardware Overview
    6.0 Extensions and Alternatives 1.0 General Overview The needs identified in the foregoing Background, and other needs and objects that will become apparent for the following description, are achieved in the present invention, which comprises, in one aspect, a method of distributing a security policy in a network in which source addresses are dynamically bound to devices. In this aspect, the method comprises generating a binding between a source address and the role or roles of a user accessing the network via a device coupled to an ingress path comprising one or more nodes.

One example of the meaning of the term "role", as used throughout this description, is described by Ferraiolo and Kuhn in, "Role-Based Access Control" (Proceedings of the 15th National Security Computer Conference, 1992). However, the meaning of the term "role," as used throughout this description, is not limited to the description of roles in Ferraiolo and Kuhn's paper.

At the time the binding is made, the source address is currently assigned to the device. The binding may be generated by one or more nodes on the ingress path. The ingress path may be a path used during authentication of the user or device itself. The binding is distributed to a filter node that is not on the ingress path. Responsive to a determination that the user is associated with a new source address, a new binding is generated to associate a new source address with the role or roles for the user. The new binding is distributed to the filter node. In one embodiment, timeout values are associated with the bindings.

Another aspect is a method of enforcing a role-based security policy, using bindings of source addresses to roles. In this aspect, a filter node receives bindings that associate source addresses to respective roles. The source addresses comprise a source address assigned to a device that accesses the network via an ingress path, wherein the filter node is not on the ingress path. The filter node stores the bindings to use for filtering packets. Upon receiving a packet, the filter node uses one of the bindings to filter the packet. Thus, the filtering is based on a role in the binding for the source address in the packet. For example, the filter node determines if it has a binding for the source address in the packet. Responsive to a determination that the filter node has the binding, the filter node processes the packet in accordance with the role or roles bound to the source address. In one aspect, responsive to a determination that the filter node does not have the binding, the filter node transmits a request for the binding. The filter node may either drop the packet or quarantine the packet while it waits for the requested binding.

In other aspects, the invention encompasses a computer apparatus and a computer-readable medium configured to carry out the foregoing steps.

2.0 Role Based Security Based on Source Addresses 2.1 Structural Overview

FIG. 1A is a block diagram that illustrates an example network arrangement 100 in which an embodiment can be used. The arrangement 100 has the ability to control user access to portions of the arrangement 100 based on the user's role. For example, the user 102a may or may not be permitted to access one of the resources 103a-d based on the user's role. The user 102a may be assigned one or more roles by a system administrator, and the roles may be stored on the authentication server 120, or is at least accessible by the authentication server 120. For example, a policy server (not depicted in FIG. 1A) may store the roles. Thus, a device other than the authentication server 120 can provide the user roles.

A user 102a currently associated with client 104a is communicatively coupled to an access device 106a. Client 104 is any network-compatible end station, such as a personal digital assistant (PDA), cellular telephone, personal computer, or workstation. The user 102a is free to use different client devices (e.g., 104a, 104b, 104c) or, in the case of a mobile client device, move the client device 104a to a different location. Thus a given user 102 may access the network via different access devices 106a, 106b. Moreover, in some cases an egress node may function as an access device. For example, egress node 140 functions as an ingress device when processing packets from client 104c.

Access device 106 is, in one embodiment, a network router that is configured to perform access control functions. Alternatively, the access device 106 may be a switch, network element that supports VPN, wireless gateway, firewall, etc. The access device 106 is also referred to herein as an ingress device. An access device can function as an egress node, depending on the direction of flow of network traffic.

When a user 102a at the client node 104a first accesses the network 108, binding logic 142 in an access device 106a generates a binding between the client's source address and roles for the user 102a. The source address is an IP address in accordance with one embodiment. However, the source address is not limited to being an IP address. The binding information is learned through an authentication exchange, in accordance with an embodiment. However, alternative methods could be used. In an embodiment using 802.1x authentication with network communication, the 802.1x authenticator (e.g., access device 106) will learn from the authentication server 120 whether the user should be permitted or denied access and if so, what the user's roles are.

Authentication server 120 is a computer that is configured to securely store user authentication information such as usernames and passwords, and to perform authentication protocols, algorithms, and supporting processes, such as one-time password (OTP) validation, encryption and decryption, message digest evaluation, etc. In one embodiment, authentication server 120 communicates with access device 106a using a secure protocol that is optimized for use in authentication. Examples of suitable protocols are RADIUS and TACACS.

Optionally a policy server is communicatively coupled to network 108 and/or to authentication server 120, or is integrated with the authentication server 120. The policy server provides a repository of user roles. In this arrangement, client 104 may initially authenticate itself to access device 106a, in cooperation with authentication server 120.

The ATUL (Address to User Lookup) query server 145 is capable of performing a response protocol for finding out network parameters about a user. For example, in response to a request that specifies an IP address, the ATUL query server 145 returns the identity of the user currently assigned the IP address.

Thus, one or more devices on the ingress path determine a binding of source address to user roles. "Binding," in this context, means a stored association of data items. The ingress path may include all devices that are involved in establishing the user's source address and role. For example, the access device 106a, authentication server 120, and DHCP server 130 are all on the ingress path for client 104a. Depending on how user roles are learned and source addresses are assigned, other devices could be on the ingress path.

The binding of source address to user roles is propagated to a filter node that is not on the ingress path. For example, the bindings are propagated to one or more of the egress nodes 140a, 140b. The egress nodes are used herein as an example of a filter node; however, it is not required that the filter nodes be egress nodes. Thus, the binding information is propagated from the point at which the binding information is learned (e.g., the access device 106, authentication server 120, etc.) to a device that might use the binding information for filtering decisions. In one embodiment, bindings are propagated without any request from the filter device for the bindings. In another embodiment, a binding is transferred to a device that requests the binding for a specific source address.

The egress nodes 140 store the bindings of source addresses to roles for use in filtering packets at the egress node 140. When the egress node 140 receives a packet, filtering logic 152 of the egress node searches its address-role binding table 150 to determine if the egress node 140 has a binding for the source address in the packet. If the egress node 140 does not have a binding, it may send a query requesting the binding. Further, the egress node 140 may take additional steps such as dropping or quarantining the packet. If the egress node 140 does have the binding, it processes the packet according with the roles bound to the source address.

In an embodiment, one or more of the devices store address-role bindings. For example, an access device 106 may store address-role bindings 130 for client devices 104 that it serves. A DHCP server 130 may have an address to role table 144 of the bindings for IP addresses that it assigned. The address-role binding table 150 on the egress nodes 140 may hold bindings for source addresses in packets processed at the egress node 140. The egress node 140 may obtain these bindings by request. In one embodiment, the egress node holds bindings for all (or substantially all) users. These bindings may be delivered to the egress node without the egress node requesting them.

Figure 1B:
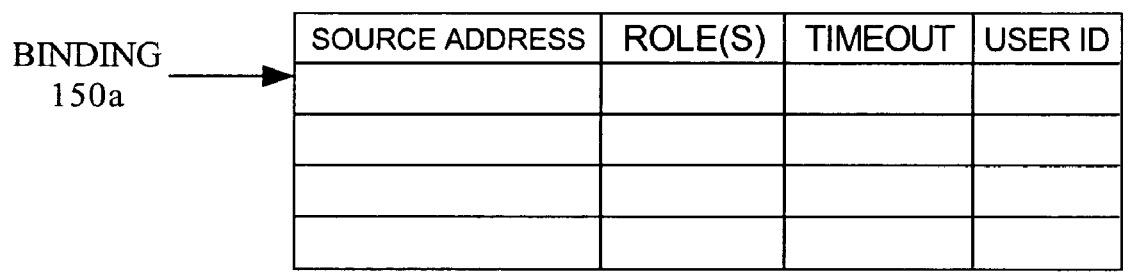
FIG. 1B is a block diagram that illustrates an overview of a network in accordance with an embodiment.

FIG. 1B depicts an address-role binding table 150, in accordance with an embodiment of the present invention. The table 150 includes columns for the source addresses, associated roles, and timeout values. Each row of the table 150 contains a binding 150a of source address to role. The table 150 has an optional user ID, which identifies the user 102. A timeout value may represent a time to live, which can be used to expire the binding.

Typically, the access device 106 only uses the bindings to filter packets when the access device 106 needs to control access to a resource 103. For example, if the destination address in the packet from the user 102a is on the same subnet as access device 106a (e.g., resource 103a), access device 106a uses the bindings to filter the packet. In many cases, an access device 106 forwards packets without doing any filtering, and a downstream device filters the packets based on the bindings. An access device 106 may function as an egress node 140, and vice versa. For example, egress node 140a may act as an access device for client 104c.

A particular user may become associated with a new source address. For example, user 102a could become associated with a new IP address if user 102a logs off client device 104a and the IP address assigned to client device 104a is reassigned to a different client device. Thus, when the user 102a logs on again to client device 104a, the user 102a could be associated with a new IP address. The user 102a might also become associated with a new IP address by logging into a different client device. Therefore, the binding of a particular source address to role can become stale.

To prevent a binding from becoming stale, each binding has a timeout value associated with it. In one embodiment, the DHCP server 130 provides a lease time for the source address. The binding timeout value is set to be equal or less to this value. Considerations with respect to DHCP releases are discussed herein below.

Propagation of bindings does not require a substantial amount of data transfer or storage. For example, even if roles, UserIDs and source addresses are propagated, only 20 bytes of information is propagated (assuming 8 bytes for role and UserIds and 12 bytes for source addresses). Even on massive networks with 100,000 users, this is only 2 MB of data. If only source addresses and roles are propagated this can be further reduced to 1.2 MB.

Figure 2A:
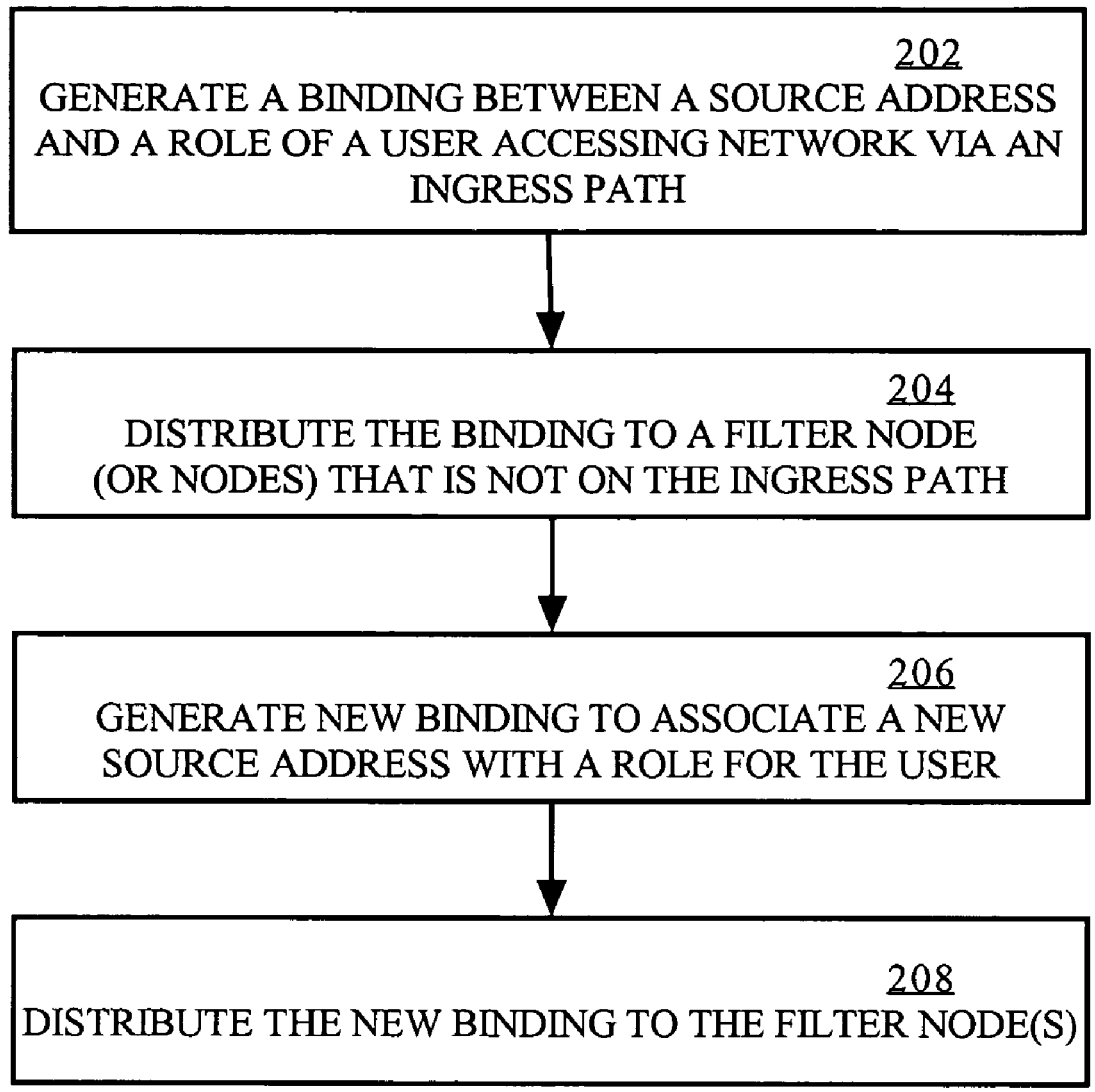
FIG. 2A is a flow diagram that illustrates a high level overview of an embodiment of a method for distributing a role based security policy.

In one aspect, the egress nodes 140 provide role-based access control within an enterprise. Role-based ACLs are configured at egress points substituting the source and possibly the destination (based on policy) addresses of an ACL with roles or userIDs. These role-based ACLs are then updated based on the source addresses associated with the entities represented in the ACL. Exemplary locations for such filtering in the enterprise include, but are not limited to:

Campus User to Data Center
    Remote VPN User to Data Center
    Branch User to Data Center
    All users to Internet 2.2 Functional Overview FIG. 2A is a flow diagram that illustrates a high level overview of one embodiment of a method for distributing source address to role bindings for enforcing a security protocol. For purposes of illustrating a clear example, the following discussion of FIG. 2A-2B reference communications among elements of FIG. 1A. However, FIG. 1A represents merely one example of a network arrangement, and the techniques described herein may be used in many other network arrangements.

In block 202, a binding of a source address to a role of a user is generated. The binding is generated by one or more devices on an ingress path through which the user connects. For example, the ingress path may include access device 106, authentication server 120, DHCP server 130, etc. The binding may include, but is not limited to, a source address (e.g., IP address), a role or roles, and a timeout value.

In block 204, the binding is distributed to a filter node (or nodes) 140. The filter node is not on the ingress path, in one embodiment. The binding is distributed in response to a request for a binding for a specified source address, in one embodiment. The binding is distributed to all or predominantly all nodes that might use it for filtering, in another embodiment. The binding may be distributed without receiving a request for it in the latter case.

The source addresses are not bound persistently to a given user or device. Therefore, it is possible that a user will be associated with a different source address (or vice versa) when that user either logs onto a different client machine, or that machine obtains a new source address. In block 206, responsive to a determination that the user is associated with a new source address, a new binding is generated to associate the new source address with a role for the user 102. The previous binding will become invalid upon expiration of the binding timeout.

In block 208, the new binding is distributed to the filter node(s) 140. Similar to block 204, the new binding may distributed to the filter node either responsive to a specific request from then filter node, or the new binding may be distributed to filter nodes without a request.

Figure 2B:
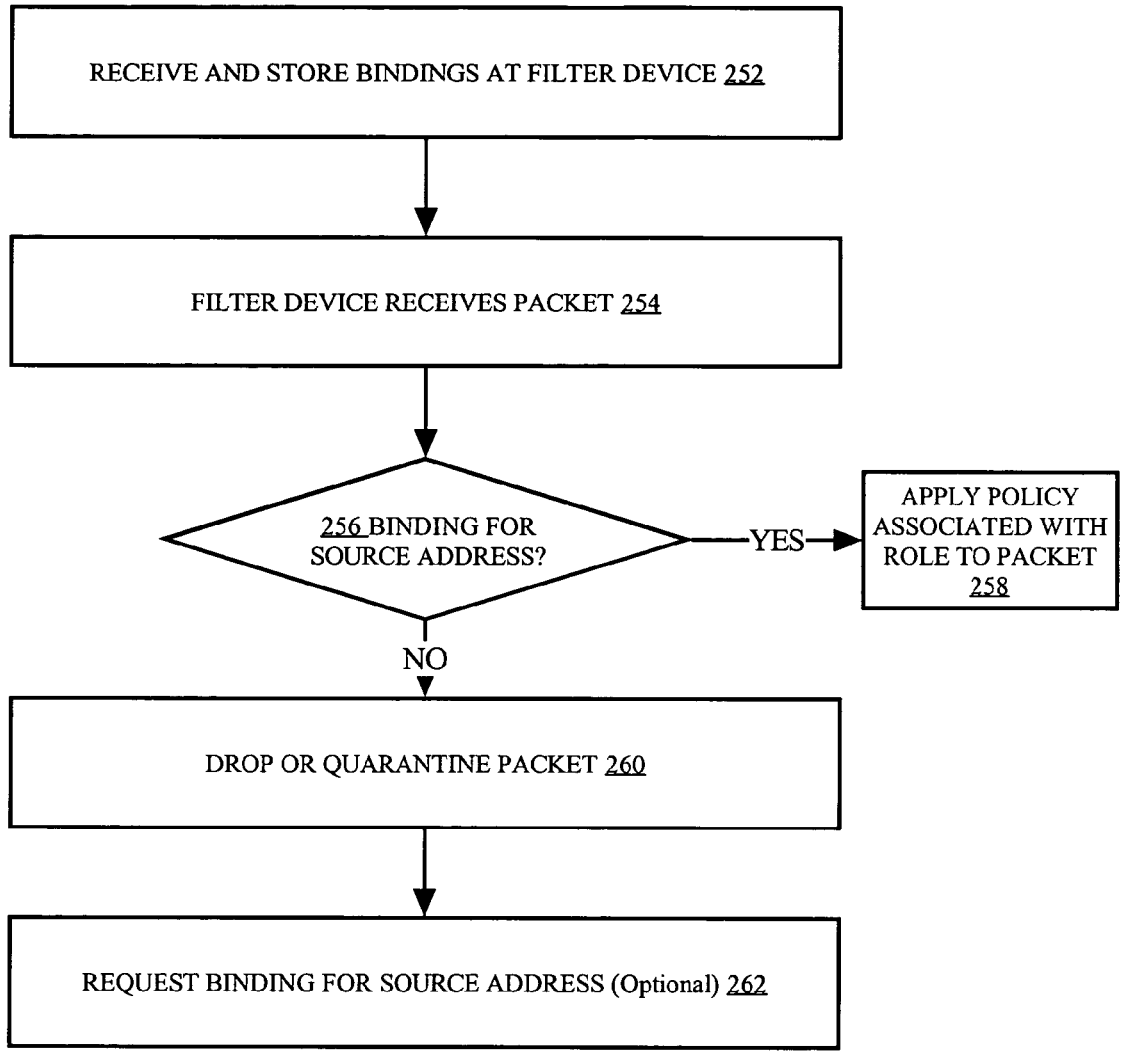
FIG. 2B is a flow diagram that illustrates a high level overview of an embodiment of a method of enforcing a role based security policy.

FIG. 2B is a flow diagram that illustrates a high level overview of one embodiment of a method for enforcing source address to role bindings at a filter node. In block 252, the filter node receives and stores bindings. The bindings associate source addresses to respective roles. The source addresses include a source address assigned to a device that accesses the network via an ingress path. Further, the filter node is not on the ingress path. The filter node may be at an egress point; however, the filter node is not limited to being at an egress point.

In block 254, the filter node receives a packet. In block 256, the filter node determines if it has a binding for the source address in the packet.

If a binding is found, then the packet is filtered, in block 258, in accordance with the role associated with the source address. For example, policies associated with the role or roles associated with the source address are used to determine the policy for processing the packet.

If a binding is not found, then the filter node 140 causes the packet to not be forwarded, in block 260. The packet may be dropped by the filter node. Alternatively, the packet maybe quarantined such that it may be forwarded later, if the filter node receives a valid role binding for the source address.

Furthermore, if the binding is not found, the filter node may request a binding for the source address, in block 262. In the case of packets associated with a reliable transport protocol such as TCP, the filter node will with high probability receive the bindings by the time the packet is retransmitted by the source and arrives at the filter node. Block 262 is optional in that the filter node may simply drop or quarantine the packet without requesting a binding for the source address.

3.0 Distribution Methods

In one aspect, the bindings are delivered to filter nodes (e.g., egress nodes 140) prior to a specific request for them from a filter node. This is referred to as "pre-population delivery." In another aspect, the bindings are delivered to nodes responsive to a request for a binding for a specific source address. This is referred to as "on demand delivery."

3.1 Pre-Population of Bindings

In a pre-population embodiment, the address-to-role bindings are propagated to substantially all nodes that may need to implement a security policy. The address-to-role bindings may be distributed through a reliable multicast mechanism. Alternatively, the address-to-role bindings may be distributed through a unicast mechanism. An advantage of always having the bindings on all nodes that may need it is faster packet processing time. Packets can be processed at the filter nodes immediately, without waiting for the binding information to be transferred to the filter node.

In one embodiment, the authentication server 120 propagates the bindings. However, another device may be used to propagate the bindings. In one aspect, the authentication server 120 performs a mass revocation of the bindings. For example, the authentication server 120 may revoke the bindings if a policy change affects the roles. The authentication server 120 can revoke the bindings even though their associated binding timers have not yet expired.

3.2 On Demand Binding Delivery

In an on demand embodiment, the address-to-role bindings are, in general, only propagated when requested. For example, when an egress node determines that it does not have the binding for a source address in a packet it is processing, it transmits a request for this binding. In one aspect, the egress node transmits a packet addressed to the source address with an "alert" flag set (e.g., a router alert flag which causes all routers on the path to that node to intercept and examine the packet before forwarding it). As the packet passes through the network to the device currently assigned the source address, eventually it will be received by the on-path device that has the bindings for source address. The access device consumes the packet rather than forwarding it, responsive to a determination that the packet is a request for the binding of a source for which it has the binding. Then, the access device returns the binding to the device that sent the packet in a response packet. For example, egress node 140b transmits a packet with a source address currently assigned to client 104a. Eventually, access device 106a strips the packet off the network 106 and sends an appropriate binding to the egress node 140b.

In another embodiment, when the egress node does not have a binding for a source address, it sends a query to a device that is able to provide network parameters about a user. For example, the egress node sends a request specifying an IP address to the ATUL query server 145. ATUL (Address to User Lookup) is a request response protocol for finding out network parameters about a user. In response to the request, the ATUL query server 145 returns the identity of the user currently assigned the IP address. More generally, any technique for determining a user's identity from an IP address may be used.

In a repository device embodiment, the address-to-role bindings are stored on nodes that serve as repositories. When a filter node needs the bindings, it sends a request to one of the repositories, which either returns the bindings or forwards the request to another repository. In one aspect, the repositories are DHCP servers. When a device needs bindings, it sends a request to its local DHCP server. For example, assume that egress node 140b needs a binding that is stored at DHCP server 130a. The egress node 140b may send a request to DHCP server 130b, which determines whether it has the requested binding. Because in this example it does not, it determines another DHCP server in a hierarchy to send the request to. Eventually, the request is received by DHCP server 130a, which returns the requested binding to the egress node 140b.

Advantages of the on demand approach include reduced storage requirements at the filter node, as entities only hold as much data as they need based on the packets processed at the filtering point. Thus, the system is highly scalable, as additional filter nodes can be added to handle additional users without requiring that current filter nodes store additional bindings.

Further, the egress and ingress points will find each other through the normal operation of the protocol. For example, there is no need for the ingress device to know which egress nodes may need to filter based on the source address, as the ingress node waits until it receives a query from the egress node to propagate the binding. Moreover. The egress node does not need to know where the bindings are stored, as the query it sends can be based on the source address it knows from the packet it is processing. Alternatively, the query can be sent to a repository, which either provides the bindings or forwards the request to another repository.

3.3 Combination Approaches

A combination of the pre-population, on demand and repository device approaches may be used. For example, when a device needs a binding it may query a DHCP server when possible or send a request with a router alert flag set in a packet addressed to the source address.

The decision on which model to use may be based on the size of the network. For smaller networks the pre-population may be preferred. For larger networks, the on-demand model may be preferred to save resources on each device. Another factor in this choice is the degree of change on the network.

4.0 Other Considerations 4.1 DHCP Releases

Typically a client device does not release its DHCP lease. However, some devices will explicitly issue a command to the DHCP server to release the lease prior to the end of the lease. Thus, the client's IP address could be reassigned by the DHCP server. This could cause a policy conflict if the egress node(s) were not made aware of the change of role for the IP address.

In one aspect, the access device drops all DHCP release requests to prevent reassignment of the IP address by the DHCP server. In another aspect, the access device 106 quarantines the DHCP release until the binding timer expires. In still another aspect, the release is forwarded to the DHCP server, along with an indication of how long it needs to wait before reassigning the source address.

4.2 Multi-User Devices

In some cases, a device could be used by more than one user to access the network. In such a case, it is possible that after a first user logs off, a second user can be authorized to access the network without a new IP address being assigned to the device. Typically, a new IP address is not provided even though there is a new authorization. In one aspect, when a login is attempted without seeking a new IP address, the login is not allowed until the binding timer expires. In one aspect, the network access device forces a DHCP release to force an IP address reassignment.

A technique to mitigate consequences of multi-user devices is to keep the timeout value associated with the binding relatively short. This will cause the filter nodes to request a new binding with sufficient frequency to mitigate the problem of a second user sending packets with the source address bound to another user.

Another technique is to have the ingress device spoof the source MAC address of the client device to force the DHCP server to give the client device a new IP address.

Still another technique is for the ingress device to NAT (Network Address Translation) the client device that has the new user. In other words, the source address of the packet is altered at the ingress device such that when the egress node looks at the IP address it determines that is does not have a binding for the source address. Therefore, the egress node queries for a new binding. The NAT entry at the access device can be flushed once the binding timer expires.

Yet another technique is to inform the DHCP server that a new user has an IP address that is bound to another user's role. The DHCP server would respond to this information by forcing the client device to obtain a new IP address.

4.3 Change in Role Associated with Binding While User Logged In

It is possible for the role associated with a binding to change without the IP address assigned to the user changing. One technique to mitigate this is to keep the timeout value associated with the binding relatively short. This will cause the filter nodes to request a new binding with sufficient frequency to mitigate change of roles while IP address assignment remains unchanged.

In another aspect, a filter node maintains one-way hash values based on the bindings in table 150 and periodically queries a database for a hash of the current bindings. If a comparison of the hash with a computation of the hash of bindings stored on the filter node reveals that there are changes to the binding, then the filter node requests an access device to provide an update of the bindings. The filter node could also request that the current version of the bindings be sent without first determining if there are changes.

4.4 IP Spoofing

Were a device to spoof the IP address of the user, it is possible that the filtering would be compromised. Therefore, techniques to prevent or at least reduce IP spoofing should be used. An exemplary technique is RPF (reverse path forwarding), which is a technique that looks at the ingress interface value and determines if the packet came in from a port that it would be expected to go out to. Unicast RPF checks should also be done throughout the network in an effort to prevent the injection of spoofed packets elsewhere. Other exemplary techniques are IP source guard and DHCP snooping, which are used to learn the IP address the client receives and bind it to just that port to prevent spoofing.

4.5 Denial of Service Attacks

In order to prevent denial of service attacks, the filter nodes rate limit the queries issued for bindings, in accordance with one embodiment. Thus, filter nodes only generate a certain number of requests for bindings in a particular time period. A denial of service attack might occur by a malicious host sending packets with source addresses for which bindings have not been generated, or at least are not stored on a filter node processing the packets. Were the filter node to send queries for all of the source addresses, the network traffic could become unacceptably high and possibly lead to denial of service.

5.0 Implementation Mechanisms—Hardware Overview

Figure 3:
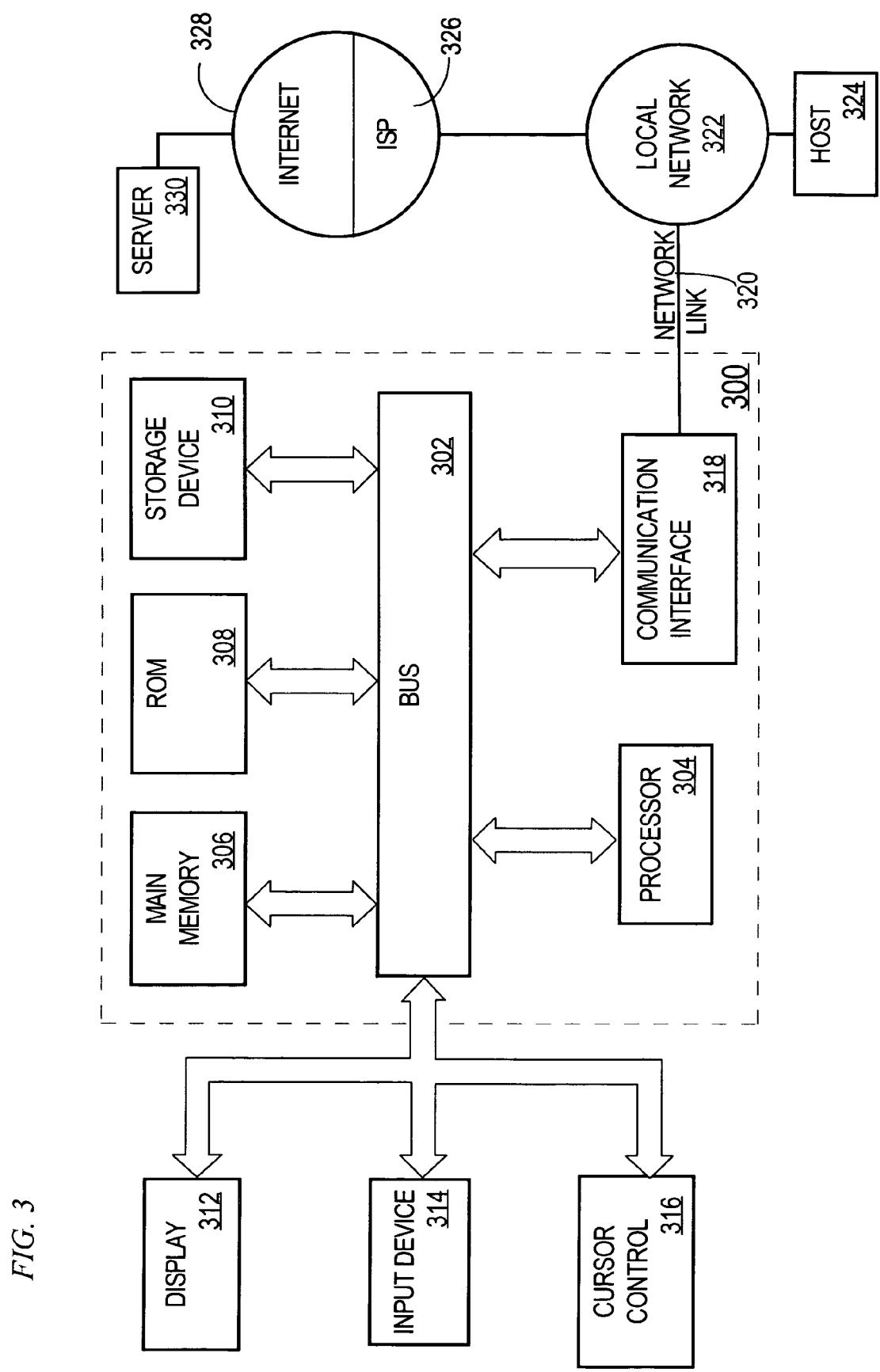
FIG. 3 is a block diagram that illustrates a computer system upon which an embodiment may be implemented.

FIG. 3 is a block diagram that illustrates a general-purpose computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory ("RAM") or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory ("ROM") 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube ("CRT"), for displaying information to a computer user. An input device 314, including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for role-based security using source addresses. According to one embodiment of the invention, role-based security using source addresses is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network ("ISDN") card or a modem to provide a data communication connection to a corresponding type of telephone line. As another example, communication interface 318 may be a local area network ("LAN") card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider ("ISP") 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for authenticating computing devices as described herein.

The received code may be executed by processor 304 as it is received, and/or stored in storage device 310, or other non-volatile storage for later execution. In this manner, computer system 300 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
   a network interface that is configured to be coupled to a network for receiving one or more packet flows therefrom;
   a processor; and
   memory storing executable instructions which, when executed by the processor, cause the processor to carry out the steps of:
      generating a first binding between a first source address and one or more roles of a user accessing the network via a device coupled to the network, wherein the first source address is currently assigned to the device for a lease time of a dynamic host configuration protocol (DHCP) lease, wherein the first binding comprises a timeout value that is based on the lease time;
      distributing the first binding associated with the first source address to a filter node;
      before the first binding expires, receiving a request to release the DHCP lease;
      preventing the DHCP release from resulting in a first DHCP reassignment of the first source address before the first binding expires and for a time determined based, at least in part, on the timeout value;
      determining that the same user is associated with a new source address;
      responsive to the determining that the same user is associated with the new source address, generating a new binding to associate the new source address with the same one or more roles of the same user;
      distributing the new binding to the filter node; and
      preventing a second DHCP reassignment of the new source address before the new binding expires;
   wherein the first source address is a first Internet Protocol (IP) address and the new source address is a new IP address.

2. The apparatus of claim 1, wherein the executable instructions, when executed by the processor, cause the processor to perform receiving a request from the filter node for the first binding, and wherein the distributing the first binding to the filter node is responsive to the request.

3. The apparatus of claim 1, wherein the device is coupled to the network via an ingress path comprising one or more nodes, and wherein the filter node is on the ingress path.

4. The apparatus of claim 1, wherein the device is coupled to the network via an ingress path comprising one or more nodes, and wherein the filter node is not on the ingress path.

5. The apparatus of claim 1, wherein the executable instructions, when executed by the processor, cause the processor to perform assigning respective timeout values to the first and the new bindings.

6. The apparatus of claim 1, wherein the executable instructions, when executed by the processor, cause the processor to perform an authentication process that accesses the one or more roles of the user, wherein the one or more roles of the user is learned as a result of the authentication process.

7. The apparatus of claim 1, wherein the executable instructions, when executed by the processor, cause the processor to perform:
generating a plurality of bindings for a corresponding plurality of users; and
distributing the plurality of bindings to a plurality of filter nodes.

8. The apparatus of claim 7, wherein the plurality of bindings are distributed to the filter nodes without receiving a request from the filter nodes for bindings for specified source addresses.

9. The apparatus of claim 1, wherein the executable instructions, when executed by the processor, cause the processor to perform:
responsive to receiving a packet with an alert flag from the filter node, determining that the filter node is requesting a binding for an address that is identified in the packet; and
responsive to determining that the filter node is requesting the binding for the address identified in the packet, transmitting the binding for the address identified in the packet to the filter node.

10. The apparatus of claim 1, wherein the executable instructions, when executed by the processor, cause the processor to perform:
storing the first and new bindings at a server that is able to answer queries for network information for a user associated with a source address.

11. The apparatus of claim 1, wherein the executable instructions, when executed by the processor, cause the processor to perform:
in response to receiving a query from said filter node as to whether said first binding is still valid, transmitting a reply to said filter node that said first binding is no longer valid.

12. A method comprising:
generating a first binding between a first source address and one or more roles of a user accessing a network via a device coupled to the network, wherein the first source address is currently assigned to the device for a lease time of a dynamic host configuration protocol (DHCP) lease, wherein the first binding comprises a timeout value that is based on the lease time;
distributing the first binding associated with the first source address to a filter node;
before the first binding expires, receiving a request to release the DHCP lease;
preventing the DHCP release from resulting in a DHCP reassignment of the first source address before the first binding expires and for a time determined based, at least in part, on the timeout value;
determining that the same user is associated with a new source address;
responsive to the determining that the same user is associated with the new source address, generating a new binding to associate the new source address with the same one or more roles of the same user;
distributing the new binding to the filter node; and
preventing a second DHCP reassignment of the new source address before the new binding expires;
wherein the first source address is a first Internet Protocol (IP) address and the new source address is a new IP address;
wherein the method is performed by one or more computing devices.

13. The method of claim 12, further comprising receiving a request from the filter node for the first binding, and wherein the distributing the first binding to the filter node is responsive to the request.

14. The method of claim 12, further comprising assigning respective timeout values to the first and the new bindings.

15. The method of claim 12, further comprising performing an authentication process that accesses the one or more roles of the user, wherein the one or more roles of the user is learned as a result of the authentication process.

16. The method of claim 12, further comprising:
generating a plurality of bindings for a corresponding plurality of users; and
distributing the plurality of bindings to a plurality of filter nodes.

17. The method of claim 12, further comprising:
responsive to receiving a packet with an alert flag from the filter node, determining that the filter node is requesting a binding for an address that is identified in the packet; and
responsive to determining that the filter node is requesting the binding for the address identified in the packet, transmitting the binding for the address identified in the packet to the filter node.

18. The method of claim 12, further comprising:
storing the first and new bindings at a server that is able to answer queries for network information for a user associated with a source address.

19. The method of claim 12, further comprising:
in response to receiving a query from said filter node as to whether said first binding is still valid, transmitting a reply to said filter node that said first binding is no longer valid.

20. A non-transitory computer-readable storage medium storing executable instructions which, when executed by one or more computing devices, cause the one or more computing devices to carry out the steps of:
generating a first binding between a first source address and one or more roles of a user accessing the network via a device coupled to the network, wherein the first source address is currently assigned to the device for a lease time of a dynamic host configuration protocol (DHCP) lease, wherein the first binding comprises a timeout value that is based on the lease time;
distributing the first binding associated with the first source address to a filter node;
before the first binding expires, receiving a request to release the DHCP lease;
preventing the DHCP release from resulting in a first DHCP reassignment of the first source address before the first binding expires and for a time determined based, at least in part, on the timeout value;
determining that the same user is associated with a new source address;
responsive to the determining that the same user is associated with the new source address, generating a new binding to associate the new source address with the same one or more roles of the same user;
distributing the new binding to the filter node; and
preventing a second DHCP reassignment of the new source address before the new binding expires;
wherein the first source address is a first Internet Protocol (IP) address and the new source address is a new IP address.

21. The non-transitory computer-readable storage medium of claim 20, wherein the executable instructions, when executed by the one or more computing devices, cause the one or more computing devices to perform receiving a request from the filter node for the first binding, and wherein the distributing the first binding to the filter node is responsive to the request.

22. The non-transitory computer-readable storage medium of claim 20, wherein the executable instructions, when executed by the one or more computing devices, cause the one or more computing devices to perform assigning respective timeout values to the first and the new bindings.

23. The non-transitory computer-readable storage medium of claim 20, wherein the executable instructions, when executed by the one or more computing devices, cause the one or more computing devices to perform an authentication process that accesses the one or more roles of the user, wherein the one or more roles of the user is learned as a result of the authentication process.

24. The non-transitory computer-readable storage medium of claim 20, wherein the executable instructions, when executed by the one or more computing devices, cause the one or more computing devices to perform:

generating a plurality of bindings for a corresponding plurality of users; and distributing the plurality of bindings to a plurality of filter nodes.

25. The non-transitory computer-readable storage medium of claim 20, wherein the executable instructions, when executed by the one or more computing devices, cause the one or more computing devices to perform:

responsive to receiving a packet with an alert flag from the filter node, determining that the filter node is requesting a binding for an address that is identified in the packet; and responsive to determining that the filter node is requesting the binding for the address identified in the packet, transmitting the binding for the address identified in the packet to the filter node.

26. The non-transitory computer-readable storage medium of claim 20, wherein the executable instructions, when executed by the one or more computing devices, cause the one or more computing devices to perform:

storing the first and new bindings at a server that is able to answer queries for network information for a user associated with a source address.

27. The non-transitory computer-readable storage medium of claim 20, wherein the executable instructions, when executed by the one or more computing devices, cause the one or more computing devices to perform:

in response to receiving a query from said filter node as to whether said first binding is still valid, transmitting a reply to said filter node that said first binding is no longer valid.

* * * * *